United States Patent Office 3,048,921
Patented Aug. 14, 1962

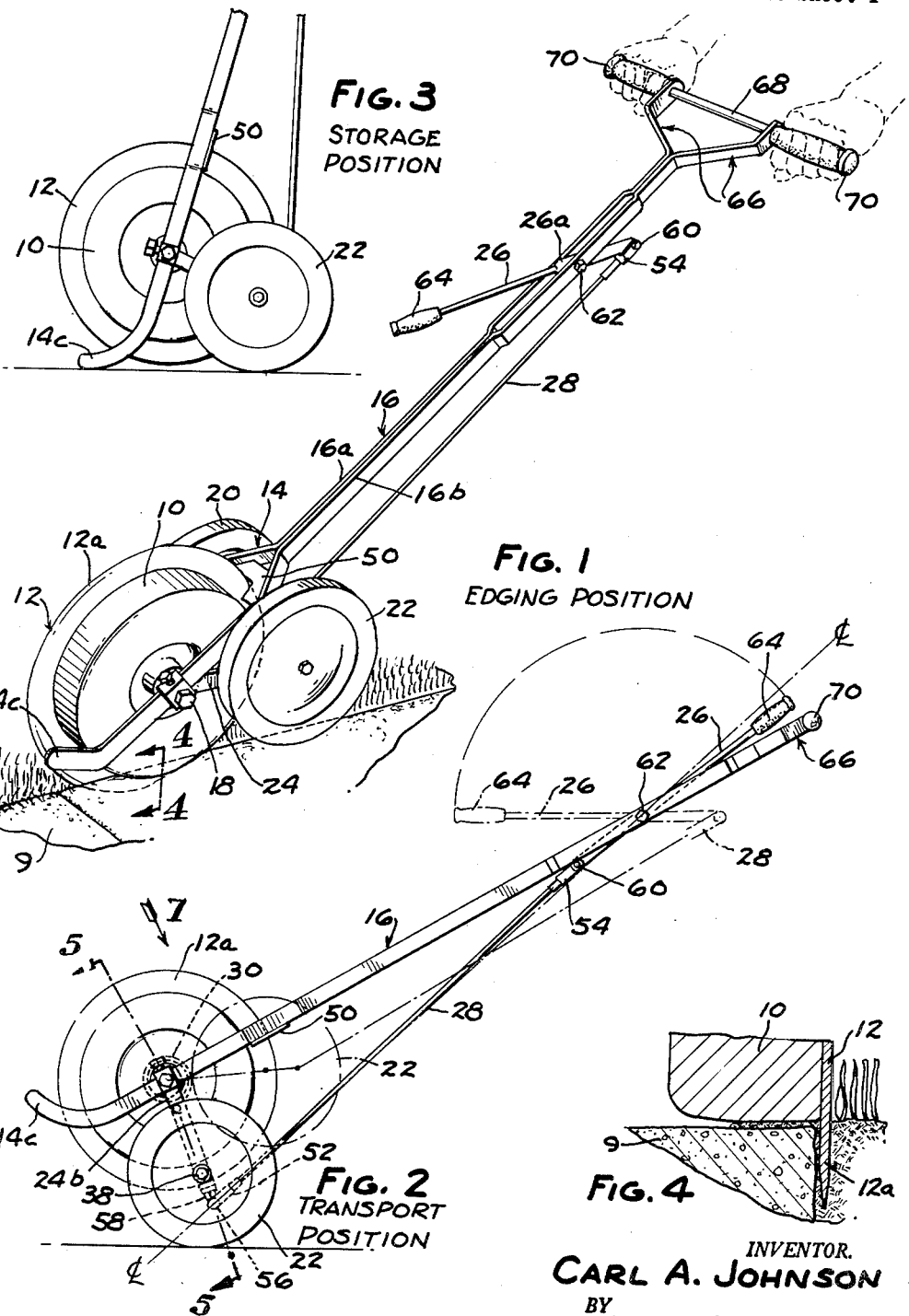

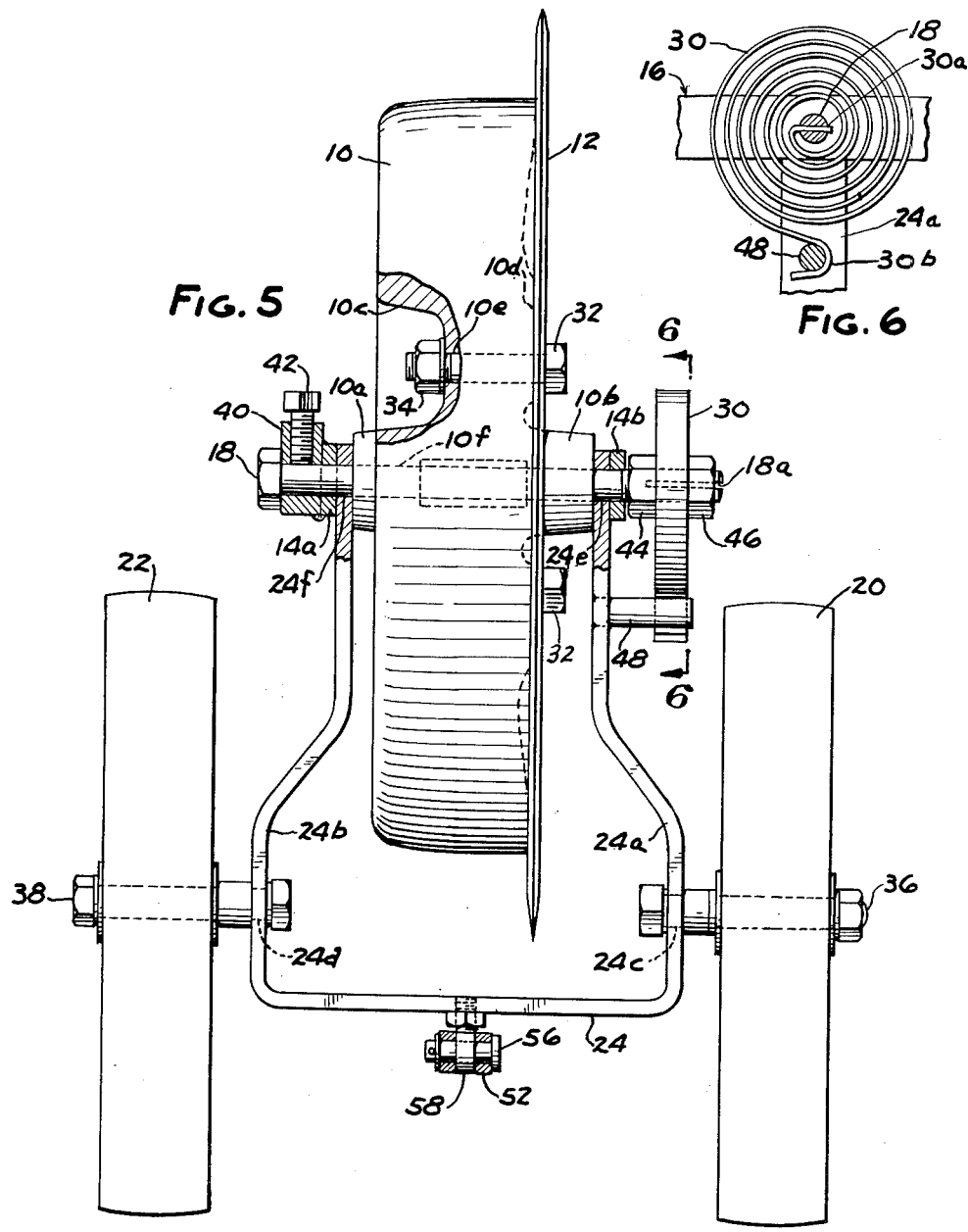

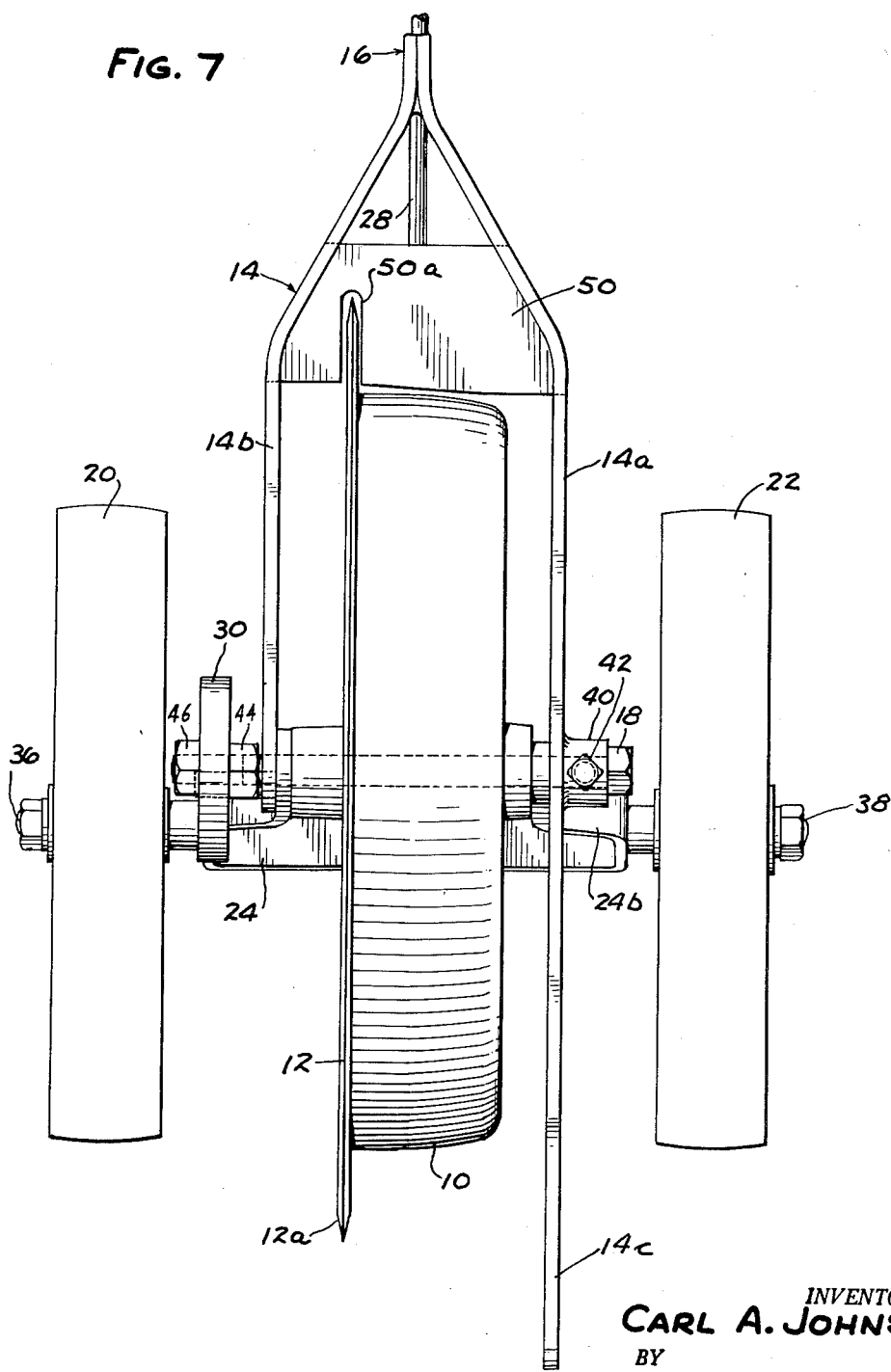

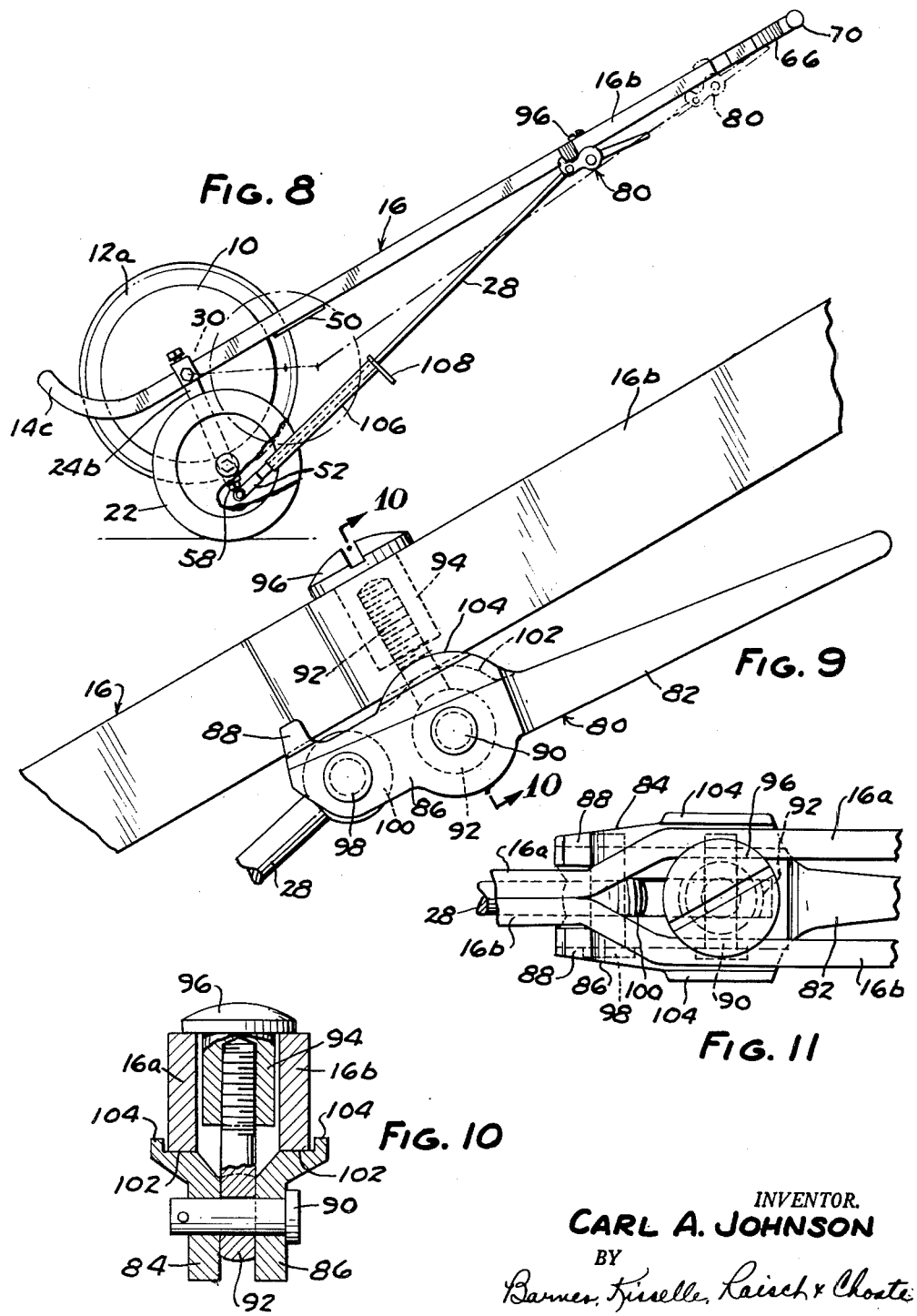

3,048,921
LAWN EDGER
Carl A. Johnson, P.O. Box 248, Okemos, Mich.
Filed Apr. 7, 1961, Ser. No. 101,501
12 Claims. (Cl. 30—292)

This invention relates to sod cutting mechanisms, and in particular to a manually operated lawn edger for trimming grass plots along walks, driveways, curbs and the like.

In recent years, power operated lawn edgers have become available at mass production prices due to the demand for a lawn edger which does not require the operator to exert a great deal of downward as well as forward force in the edging operation, a common characteristic of manual lawn edgers of the prior art. However, power edgers typically utilize a high speed rotary blade in order to obtain effective cutting action, and hence, an unsafe condition arises from stones, sand or other objects being thrown by the blade, or from the blade itself breaking while in operation. Moreover, high speed operation contributes to rapid wear of the cutting blade thereby nessitating frequent and costly replacement of cutting blades and other parts.

Accordingly, it is an object of the present invention to provide a manually operated lawn edger which is economical in construction and maintenance, and which is operated with a minimum of effort.

Another object is to provide a lawn edger which utilizes slow moving parts for safety of operation while providing effective cutting action.

A further object is to provide a lawn edger of the above character having retractable transport wheels so that the lawn edger may be easily transported from one location to another without injuring the cutting blade thereof or the lawn, and without requiring the operator to lift the lawn edger.

Still another object of the invention is to provide a transport mechanism readily adaptable to the above lawn edger or other devices of similar character wherein the transport mechanism is economical to manufacture and easy to operate.

In the accompanying drawing:

FIG. 1 is a perspective view illustrating a lawn edger of the present invention being used in the edging position thereof to trim off grass and turf which has overgrown the edge of a walk.

FIG. 2 is a side elevational view of the edger in transport position.

FIG. 3 is a fragmentary side elevational view of the edger in a storage position.

FIG. 4 is a fragmentary cross-sectional view taken on the line 4—4 of FIG. 1 more clearly illustrating the sod cutting blade of the edger in operation along the edge of the walk.

FIG. 5 is a cross sectional view taken on the line 5—5 of FIG. 2 and looking forward from the operator's position, with some portions shown in elevation.

FIG. 6 is a cross sectional view taken on line 6—6 of FIG. 5 showing a counterbalancing spring for retracting the transport wheels.

FIG. 7 is a fragmentary top view of the edger looking in the direction of the arrow 7 of FIG. 2.

FIG. 8 is a fragmentary side elevational view of the edger locked in transport position by a modified form of transport wheel retracting and locking mechanism also in accordance with the present invention.

FIG. 9 is an enlarged fragmentary side view of the modified locking mechanism.

FIG. 10 is a cross sectional view taken on line 10—10 of FIG. 9.

FIG. 11 is a fragmentary top view of the modified locking mechanism shown in FIG. 9.

Referring in detail to the accompanying drawings, FIG. 1 shows the lawn edger of the invention in working position and being pushed along the edge of a walk 9 by an operator. The lawn edger generally comprises a heavy cast iron cylindrical hub 10 to which is fastened a circular disk cutting blade 12 having a peripheral cutting edge 12a which extends radially beyond the outer periphery of hub 10. Hub 10 and blade 12 together form a main cutting wheel which is rotatably mounted in a yoke 14 of a handle assembly 16 by means of an axle 18. A pair of retractable transport wheels 20 and 22 are rotatably mounted on a U-frame support 24 which is also pivoted on axle 18. The transport wheels are raised and lowered by means of a toggle linkage which includes a hand lever 26 fulcrumed on handle assembly 16 and connected via a linking rod 28 with the U-frame support 24. The transport wheels 20, 22 are held in a raised inoperative position by a counterbalancing spring 30 (FIGS. 5–7), and are held locked in the lowered transport position by the toggle linkage. The details of the above as well as other features of the invention will become apparent in the detailed description which follows.

Referring to the rear view of FIG. 5 wherein the edger is shown in transport position, the main wheel hub 10 comprises a grey iron casting having journal hub portions 10a and 10b extending axially from the opposite sides thereof. One side of hub 10 is provided with an annular recess 10c while the opposite side of hub 10 has an annular boss 10d, the outer face of which is flush with the outermost surface of this side of the hub. Three bolt holes 10e are cored through hub 10 at 120° intervals, the holes being spaced from and parallel to the axis of hub 10. Cutter blade 12 has a center hole which receives journal hub portion 10b and permits the blade to be bolted against the face of annular boss 10d by three headed bolts 32. Nuts 34 are threadably received on the inner ends of bolts 32 and are disposed in the annular recess 10c so as not to interfere with operation of U-frame 24. An axial bore 10f extends through the center of hub 10 and is reduced in diameter through the hub portions 10a and 10b to provide bearing surfaces for axle bolt 18 journalled therethrough.

The transport wheels 20, 22 are supported respectively on axle bolts 36 and 38 which are fastened to the spaced, parallel arms 24a and 24b, respectively, of U-frame 24 through co-axially aligned bolt holes 24c, 24d thereof. Arms 24a and 24b are provided with holes 24e, 24f at their free ends for receiving axle bolt 18 therethrough, the arms thereby providing a pivotal mounting of transport wheels 20, 22 on axle bolt 18.

The handle assembly 16 is also supported on axle bolt 18 by means of yoke structure 14 thereof, yoke 14 consisting of the bent apart extensions 14a and 14b of a pair of handle frame members 16a and 16b. The lower end of arm 14b is provided with a hole for receiving axle bolt 18, while arm 14a at a point opposite thereto has a collar 40 welded on the outer side thereof, both arm 14a and collar 40 having a co-axial bore adapted to receive axle bolt 18 therethrough. Collar 40 threadably receives a set screw 42 which is screwed down against axle bolt 18 to hold the same fixed against rotation with respect to handle assembly 16.

The other end of axle bolt 18 is threaded to receive lock nuts 44 and 46 which serve to hold a uniplanar coil spring 30 therebetween. As shown in FIG. 6, spring 30 is a closely wound spiral of spring steel capable of developing a high torque output over a relatively small angular range. The end 30a of the innermost convolution of spring 30 is straightened for insertion in a transverse bolt slot 18a extending axially inward from the threaded end of bolt 18, thereby anchoring spring 30 with respect to handle assembly 16. The outer working end 30b of spring 30 is reversely bent to form a hook which engages a stud 48 welded to the outer side of U-frame arm 24a. To adjust spring 30 after installation on bolt 18, it is only necessary to loosen set screw 42 and rotate axle bolt 18 by means of a wrench approximately 180° in a counterclockwise direction as viewed in FIG. 2. This rotation of axle bolt 18 rotates spring 30, causing the spring to raise transport wheels 20, 22 to their inoperative position while fully tensioning the spring. Set screw 42 is then tightened against axle bolt 18 to lock spring 30 at this setting.

As shown in FIG. 7, a scraper blade 50 extends between yoke arms 14a and 14b at the converging portion of yoke 14, blade 50 being welded to the bottom edges or centers of the arms. A slot 50a is formed in scraping blade 50 which is slightly longer and wider than the cutting edge 12a so as to receive the same therein with the forward edge of scraper blade 50 lying closely adjacent the outer circumference of hub 10. Scraper blade 50 serves to remove sod, dirt or other clinging material from cutting blade 12 as well as from the outer circumference of hub 10 during rotation of the cutting wheel in either forward or reverse operation of the lawn edger.

Referring to FIG. 2, it will be seen from the solid and dotted line positions of the transport wheels that the same are retractable through an arc of approximately 75° by means of the toggle structure comprising hand lever 26 and link rod 28. Link rod 28 has a pair of connector yokes 52 and 54 respectively welded to opposite ends thereof, yoke 52 at the lower end of rod 28 being pivotally connected by a pin 56 to an eye bolt 58 which is threaded into the center of the transport wheel U-frame support 24 (FIG. 5). Connector yoke 54 couples the upper end of rod 28 to the bottom end of hand lever 26 via another pivot pin 60. Hand lever 26 has an enlarged bearing section 26a serving as a fulcrum point and adapted to bear against the inner sides of frame members 16a, 16b at a point therealong where these members are spaced apart to provide an open framework. A bolt 62 is received in the center of the opened portion of the frame members 16a 16b and extends through bearing section 26a of the lever arm to pivotally support the same therein. The upper portion of lever 26 is longer than the lower portion to provide a mechanical advantage in raising and lowering the transport wheels, and the upper end of lever 26 carries a hand grip 64 within convenient reach of the operator. At the upper end of the handle assembly 16 the frame members 16a, 16b are again bent apart to form a yoke 66 which supports a handle bar 68 preferably provided with suitable hand grips 70 on the opposite ends thereof which project beyond yoke 66. At the lower forward end of handle assembly 16 the yoke frame member 14a extends beyond the knife edge 12a of cutter blade 12 and is curved upwardly for additional ground clearance when edging and to form a supporting arm 14c which cooperates with transport wheels 20, 22 to form a three point suspension for the edger in the storage position shown in FIG. 3.

In operation, the lawn edger of the invention is pushed along the edge of a sidewalk 9 (FIG. 1) with the transport wheels 20, 22 held spaced from the ground in an inoperative position by counterbalancing spring 30. As shown in FIG. 4, the outer circumference of cast iron hub 10 rolls on the upper edge of sidewalk 9 while the knife portion 12a cuts down into the sod to trim off grass or turf growing over the sidewalk. In one embodiment of the edger intended for use in cutting heavy turf overgrowth, the hub 10 is 12 inches in diameter and 2½ inches in thickness, and when made of grey cast iron weighs approximately 72½ lbs. It will be appreciated that a cutting wheel of this size provides high torque with a minimum rolling resistance while its weight plus that of the remainder of the edger assembly provides momentum and gravitational forces urging the knife edge 12a into the sod to perform the cutting operation. Hence it is only necessary that the operator push the lawn edger forward without consciously exerting a downward force. The relatively wide circumferential face of the hub 10 helps stabilize the edger while it is being pushed. Also, the spacing of transport wheels 20, 22 in the raised position thereof and the spacing of hand grips 70 contribute to the ease of maintaining the edger in upright position.

When it is desired to lower the transport wheels 20, 22 to roll the edger from one section of the lawn to another, or over surfaces which would damage blade 12, it is only necessary to grasp hand grip 64 on lever arm 26 and pull the same towards the operator until it reaches the position shown in solid in FIG. 2. Further movement in this direction is prevented by connector yoke 54 abutting the underside of handle assembly 16. When lever arm 26 is in this transport position, the pivotal connection provided by pin 60 is disposed above a line CL—CL taken between pivot bolt 62 and pivot pin 56, this line being the center line of the toggle linkage formed by rod 28 and lever 26. Hence, in this over-center position endwise thrust forces developed by spring 30 reacting via U-frame 24 on rod 28 develop a clockwise torque (as viewed in FIG. 2) on the lower portion of lever arm 26 so that linking rod 28 and hence transport wheels 20, 22 are locked in the down position. It is to be understood that the center of gravity of the lawn edger in transport position is forward of the transport wheel axle bolts 36, 38 so that a counterclockwise torque is developed in U-frame support 24 which is cumulative to that provided by spring 30 to insure sufficient endwise forces on rod 28 to maintain the linkage in locked position. Frictional or other resistance to the transport wheels during forward motion also serves to increase the locking force. Before lowering the transport wheels to transport position it is preferred to pivot the handle assembly 16 close to the vertical, as in FIG. 3, so that the weight of the cutting wheel and hub 10 is not manually lifted while the transport wheels 20, 22 are being lowered. Then after the transport wheels are pivoted to transport position, the full leverage of handle assembly 16 is available to help lift the weight of hub 10 up off the ground and over the transport wheels, as in FIG. 2.

When it is desired to resume the edging operation, the cutter blade and hub are lowered to the ground by rotating lever arm 26 in a counterclockwise direction into the dotted line position indicated in FIG. 2. This movement requires very little effort on the part of the operator inasmuch as the leverage of arm 26 is more than adequate to move connector yoke 54 over the dead center position (line CL—CL) of the toggle linkage. Also, since the locked position of connector yoke 54 is close to this dead center position, the mechanical advantage provided by the toggle itself is close to maximum. Once connector yoke 54 has moved counterclockwise past dead center, the weight of hub 10 assists the tension of coil spring 30 in raising the transport wheels until the hub reaches the ground. From this point onward, spring 30 acts alone to raise the transport wheels to the inoperative position of FIG. 1. There is ample tension remaining in spring 30 to hold the wheels securely in the raised position during the edging operation.

It is to be noted that counterbalance spring 30 is preferably a compact uniplanar coil spring which is easily mounted and adjusted on axle bolt 18. This type of spring is readily available as a commercial item in the automotive industry and is capable of developing 225 to 275 inch pounds over its working range of approximately 75 degrees. Thus it is an inexpensive and highly reliable means for lifting the transport wheels, and eliminates the necessity of providing some form of locking means to hold the wheels in the raised, inoperative position thereof.

While a cutter blade 12 having a smooth edge has been disclosed, it is to be understood that other forms of cutter blades may be used in place of cutter blade 12, such as those having serrated or other special forms of cutting edges for particular applications. Also, although tests have shown that hub 10 and blade 12 are preferably 12" and 15" in diameter respectively, a reasonable range of sizes may be interchangeably used without departing from the inventive concepts disclosed by the above construction.

Referring to FIGS. 8, 9, 10 and 11, there is shown a modified form of retracting and locking mechanism for transport wheels 22. Those elements of the lawn edger which are identical to previously described elements are given like reference numerals and the description thereof not repeated. The modified locking mechanism includes a self-locking, hand release lever 80 which comprises a lever arm 82 and a pair of parallel arms 84, 86 extending integrally from the inner end thereof each having an integral locking lug 88 extending upwardly from the respective forward ends thereof. Arms 84, 86 are each enlarged intermediate the ends thereof and have a bore hole therethrough in co-axial alignment with one another for receiving a journal pin 90 therethrough. A screw eye-bolt 92 is journalled on pin 90 between arms 84, 86, and an internally threaded sleeve 94 having a screw head 96 on the upper end thereof is slidably received on the top edges of and between the bent apart handle frame members 16a and 16b and threadably receives the threaded end of screw eye bolt 92 to thereby slidably couple lock-release lever 80 to handle 16. Another pair of co-axial bore holes are provided in outer ends of arms 84, 86 which receive another journal pin 98 therethrough. A ring 100, welded on the upper end of link rod 28, is journalled on pin 98 between the outer ends of arms 84, 86 to thereby couple the lock-release lever 80 to rod 28.

The upper portions of arms 84, 86 diverge from one another at the outer ends thereof so that locking lugs 88 are sufficiently spaced from one another to slidably receive handle frame members 16a, 16b therebetween in the portion of the handle assembly 16 where these frame members are pressed together. The upper portions of arms 84, 86 above journal pin 90 also diverge from one another (FIG. 10) and have upper fulcrum surfaces 102 curved concentrically with pin 90 which are correctly spaced apart to tangentially bear against the bottom edges of handle frame members 16a, 16b where these members are spaced apart in handle assembly 16. A vertical guide flange 104 is provided along each outer edge of fulcrum surfaces 102 of arms 84, 86 to hold lever 80 parallel to the longitudinal axis of handle 16 as it is pivoted relative thereto by rolling, sliding contact of curved fulcrum surfaces 102 thereagainst.

Referring to FIG. 8, a hollow tube or sleeve 106 is received on the lower portion of link rod 28 so as to abut at the lower end thereof against the upper end of connector yoke 52. The upper end of sleeve 106 carries a flat plate 108 which extends from the lower side thereof in a plane perpendicular to rod 28 to provide a foot pedal.

When the lawn edger as modified above is in the transport position of FIG. 8, the endwise thrust forces exerted on rod 28 by spring 30, the downward gravitational force at the center of gravity of the edger and the forces reacting to forward movement of the edger are all transmitted by rod 28 to lever 80 via pin 98. The vector of this force parallel to handle frame member 16a, 16b is directed towards the handle bar end of handle assembly 16, but lever 80 is locked against movement in this direction by the engagement of locking lugs 88 with the converging portions of frame members 16a, 16b at the lower end of the spaced apart portions thereof. The other vector of the force transmitted by link 28 is directed upwardly perpendicular to the longitudinal axis of handle assembly 16 and serves to hold arms 84, 86 in abutting engagement with handle frame members 16a, 16b both at lugs 88 and at curved surfaces 102 of the arms. It is to be understood that screw sleeve 94 is threadably adjusted relative to screw eye 92 so that the undersurfaces of screw head 96 and the curved surfaces 102 of the lever 80 are sufficiently spaced apart to permit sliding movement thereof on the upper and lower edges respectively of frame members 16a, 16b.

To raise transport wheels 22 from the transport position of FIG. 8 to the edging position of FIG. 1, it is only necessary to grip lever arm 82 with one hand and squeeze the same upwardly so that lever 80 pivots counterclockwise (as viewed in FIG. 9) in a vertical plane parallel to the longitudinal axis of handle 16, curved surfaces 102 serving as a rolling, sliding fulcrum point for lever 80 during this movement. This pivotal movement of lever 80 causes locking lugs 88 to move downwardly until they are disengaged from handle frame members 16a, 16b. With lever 80 thereby longitudinally unlocked from handle 16, the longitudinal forces exerted via link rod 28 on lever 80 causes it to slide along the under edges of frame members 16a, 16b, thereby allowing U-frame 24 with transport wheels 22 thereon to pivot counterclockwise until the transport wheels are in the raised position indicated in FIG. 2. Transport wheels 22 are then held in this position by the force of counterbalance spring 30 acting on U-frame 24.

To lower the transport wheels 22 from the raised position thereof, it is only necessary for the operator to press pedal 108 downwardly with one foot towards the transport wheels so that the same are pivoted to the lowered position of FIG. 8. During this movement, lever 80 slides downwardly along handle 16 until lugs 88 reach the narrow portion of the handle where they are automatically urged into locking engagement with the handle frame members 16a, 16b by the pressure of rod 28. Preferably, the lawn edger is pivoted upwardly to the storage position of FIG. 3 before releasing lever 80 to automatically raise the transport wheels 22, and before depressing foot pedal 108 to lower the transport wheels 22.

From the foregoing description it will be apparent that a lawn edger constructed in accordance with the invention is economical to manufacture, assemble, and maintain.

The above lawn edger has been found to be substantially as effective in operation as the much more expensive power type lawn edgers without increasing the effort required to operate the edger, and at the same time it is more reliable and much safer in operation due to its simplicity and slow moving parts. In addition, the edger is self-cleaning due to the provision of scraping blade 50, and may be conveniently stored in an upright position so as to occupy a minimum of space.

I claim:

1. A lawn edger including in combination, a handle frame extending rearwardly and upwardly at an angle to the ground in an operative position of the lawn edger, a weighted sod cutting wheel rotatably mounted on said handle frame near the lower, forward end thereof, a pair of transport wheels, frame means pivoted on said handle frame and rotatably supporting said transport wheels in spaced apart positions with said cutting wheel disposed therebetween, said transport wheels being pivotable with said frame means in an arc spaced from the axis of rotation of said cutting wheel, a spring coupled between said frame means and said handle frame for pivotably raising and holding said transport wheels spaced from the ground during the cutting operation of said edger, and releasable support means connected between said handle frame and said frame means for locking said frame means with said transport wheels thereon in a lowered position wherein said frame means supports said cutting wheel free from contact with the ground for carriage by said transport wheels.

2. The combination recited in claim 1 wherein said handle frame has an axle non-rotatably mounted therein at the lower end thereof, said weighted sod cutting wheel being rotatably mounted on said axle and said frame means being pivoted on said axle, said spring comprising a spiral coil spring having the inner end thereof secured to said axle and having the outer end thereof secured to said frame means for biasing said transport wheels spaced from the ground during the cutting operation of said edger.

3. The combination set forth in claim 1 wherein said releasable support means comprises a toggle linkage including a hand lever fulcrumed on said handle frame and a linking rod connecting one end of said hand lever to said frame means, the connection of said linking rod with said one end of said hand lever comprising the knee of said toggle linkage, said knee connection abutting said handle frame in an overcenter position of said toggle linkage whereby said transport wheels are locked in operative position by rearwardly directed force on said linking rod resulting from the force of said spring acting on said frame means.

4. The combination recited in claim 3 wherein said toggle linkage is dimensioned and positioned on said handle frame such that said transport wheels are lockable in an operative position wherein the center of gravity of said weighted sod cutting wheel is forward of the axis of rotation of said transport wheels so that weight of said cutting wheel acting on said frame means provides a rearwardly directed force on said linking rod cumulative to the force of said spring.

5. The combination recited in claim 1 wherein said handle frame includes stop means thereon, and wherein said releasable support means includes lever means supported on said handle frame for sliding movement therealong from said stop means to a point spaced rearwardly therefrom, said lever means having locking means thereon adapted to engage said stop means to thereby lock said lever means against sliding movement towards said point, said lever means being pivotable to move said locking means thereof between a locked engaged position and a released disengaged position relative to said stop means when said lever means is located adjacent said stop means, and linking means rigidly coupling said spring urged frame means to said lever means so that pivotal movement of said frame means between the operative and raised positions thereof causes sliding movement of said lever means, while in the released position thereof, along said handle frame between said stop means and said point spaced therefrom.

6. The combination recited in claim 5 wherein said linking means is coupled between said frame means and lever means at an angle with said handle frame to produce a component of force urging said locking means of said lever means while adjacent said stop means into engagement therewith to thereby maintain said transport wheels locked in the operative position thereof.

7. The combination recited in claim 6 wherein said handle frame comprises a pair of frame members extending in side-by-side relation with one of said frame members having a portion diverging away from the other of said frame members to form said stop means and then extending parallel to and spaced from said other frame member, and which further includes clamp means pivotally connected to said lever means and slidably engaging the top surfaces of said frame members along the spaced apart portions thereof for slidably supporting said lever means on said frame members, said lever means having a curved surface in tangential sliding contact with the bottom surfaces of said spaced apart portions of said frame members to provide a sliding fulcrum for said pivotal movement of said lever means, said locking means on said lever means comprising a lug extending therefrom at a point spaced from said curved surface thereof so that said lug is respectively positioned for abutting engagement with and disengagement from said diverging portion of said one frame member when said lever means is respectively pivoted to the locking and release positions thereof whereby said transport wheels are automatically raised upon said lever means being pivoted to the release position thereof.

8. A lawn edger including in combination, an axle, a weighted cutting wheel journalled on said axle, a handle frame assembly comprising a pair of side-by-side members spaced apart at the forward end of said assembly to form a pair of yoke arms individually supported on said axle with said cutting wheel disposed therebetween, said members of said handle frame assembly being joined together to provide an arm portion extending rearwardly from said yoke arms in a plane at right angles to said axle said members diverging rearwardly of said arm portion to form an opening therebetween, a generally U-shaped support frame pivoted at the extremities thereof on said axle with said cutting wheel being disposed therebetween, a pair of transport wheels individually journalled on opposite sides of said support frame in co-axial positions spaced from one another and from the extreme ends of said support frame for pivotal movement about said axle, counterbalancing spring means coupled between said handle frame assembly and said support frame for urging said transport wheels towards said handle frame assembly, and toggle means pivotally supported on said members of said handle frame assembly at the opening therein and being coupled to said support frame for rotating the same to raise and lower said transport wheels and to lock the same in operative position whereby said lawn edger may be transported with said cutting wheel carried by said support frame in inoperative position free of the ground.

9. The combination set forth in claim 8 wherein said toggle means comprises a hand lever pivotably mounted between said members of said handle frame assembly in the opening thereof for movement therein, said hand lever having upper and lower arms extending from the opening with said upper arm being longer than said lower arm to provide a mechanical advantage, and a linking rod pivotably connected to said lower arm and to said transport wheel support frame so that rotation of the upper arm of said hand lever towards the upper end of said handle frame assembly pivots said transport wheels to operative position, said connection between said linking rod and said hand lever abutting said arm portion of said handle frame assembly at a point spaced slightly above the center line of said hand lever and rod so that said toggle means is locked by rearwardly directed forces exerted on said linking rod by the lawn edger structure acting on said support frame.

10. The combination set forth in claim 8 wherein one of said yoke arms of said handle frame assembly extends forwardly from said axle beyond said cutting wheel to form with said transport wheels in the lowered operative position thereof a three point support for said lawn edger when the same is tilted forward from its operative position to an upright storage position.

11. A lawn edger including in combination, an axle having a slot extending axially from one end thereof, a cutting wheel journalled on said axle, a handle frame having a pair of yoke arms extending from one end thereof mounted on said axle with said cutting wheel disposed therebetween, one of said yoke arms having adjustable fastening means for preventing rotation of said axle relative to said handle frame, a support frame having a pair of spaced arms pivoted on said axle with said cutting wheel being disposed therebetween, a pair of transport wheels rotatably supported on said support frame in co-axial positions spaced from said axle for retractable movement about said axle, a uniplanar coil spring received on said axle with the innermost convolution of said spring being received in said slot of said axle and with the outermost convolution of said spring being connected to said support frame for biasing said transport wheels into a raised inoperative position rearwardly of said cutting wheel, linkage means movably connected to said handle frame and being coupled to said support frame for movement with the same and means for locking said linkage means to said handle frame so as to lock the transport wheels in a transport position in which said cutting wheel is carried by said support frame out of contact with the ground.

12. The combination set forth in claim 1 wherein said handle frame comprises a pair of frame members extending for a portion of their length adjacent one another and being joined together along said adjacent portions, said frame members diverging from one another at the lower end of said handle frame so as to form yoke arms straddling said sod cutting wheel for supporting the same therebetween, said frame members also diverging from one another and then running parallel to one another near the upper end of said handle frame to form an opening in the handle frame, said releasable support means comprising movable connector means disposed within said handle frame opening and having portions engaged with the opposite edges of said frame members for sliding movement therealong within the confines of said opening, linking means rigidly coupling said spring urged frame means to said connector means and releasable locking means for interconnecting said frame members with said connector means so as to prevent movement thereof in said handle frame opening.

References Cited in the file of this patent
UNITED STATES PATENTS

| | | |
|---|---|---|
| 1,222,031 | Rial et al. | Apr. 10, 1917 |
| 1,237,752 | Comi | Aug. 21, 1917 |
| 2,075,301 | Pipenhagen | Mar. 30, 1937 |
| 2,718,838 | Schumacher | Sept. 27, 1955 |